United States Patent
Aoki (10) Patent No.: US 11,134,369 B2
(45) Date of Patent: Sep. 28, 2021

(54) COMMUNICATION APPARATUS HAVING OVERLAPPING PERIODS FOR COMMUNICATION WITH OTHER COMMUNICATION APPARATUSES, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Hitoshi Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 594 days.

(21) Appl. No.: 15/779,684

(22) PCT Filed: Nov. 11, 2016

(86) PCT No.: PCT/JP2016/083535
§ 371 (c)(1),
(2) Date: May 29, 2018

(87) PCT Pub. No.: WO2017/094476
PCT Pub. Date: Jun. 8, 2017

(65) Prior Publication Data
US 2020/0314625 A1    Oct. 1, 2020

(30) Foreign Application Priority Data
Dec. 3, 2015    (JP) .............................. JP2015-236993

(51) Int. Cl.
H04L 29/08    (2006.01)
H04W 8/00    (2009.01)
(Continued)

(52) U.S. Cl.
CPC .............. *H04W 8/005* (2013.01); *H04L 67/16* (2013.01); *H04W 28/18* (2013.01); *H04W 48/16* (2013.01);
(Continued)

(58) Field of Classification Search
CPC ................ H04L 12/4015; H04L 67/16; H04N 1/000954; H04W 72/00; H04W 72/12;
(Continued)

(56) References Cited

U.S. PATENT DOCUMENTS 7,729,350 B2    6/2010    Singh et al.
7,796,545 B2    9/2010    Surineni et al.
(Continued)

FOREIGN PATENT DOCUMENTS

CN    101366247 A    2/2009
CN    104780510 A    7/2015
(Continued)

OTHER PUBLICATIONS

WiFi Alliance, "Neighbor Awareness Networking Technical Specification Version 1.0", May 1, 2015, pp. 1-98 (Year: 2015).*
(Continued)

*Primary Examiner* — Salvador E Rivas
(74) *Attorney, Agent, or Firm* — Venable LLP (57) ABSTRACT

A communication apparatus, in a Neighbor Awareness Networking (NAN) Discovery Window (DW), performs a first communication with another communication apparatus that belongs to an NAN cluster to which the communication apparatus belongs, and performs a second communication with another communication apparatus belonging to the NAN cluster in a period other than the DW. When the communication apparatus has determined a schedule for communicating with a first other communication apparatus, in a case of the second communication with a second other
(Continued)

communication apparatus different to the first other communication apparatus, the communication apparatus determines a schedule for communicating with the second other communication apparatus so that a period for the second communication with the first other communication apparatus and a period for the second communication with the second other communication apparatus at least partially overlap.

15 Claims, 6 Drawing Sheets (51) Int. Cl.
*H04W 48/16* (2009.01)
*H04W 52/02* (2009.01)
*H04W 72/04* (2009.01)
*H04W 28/18* (2009.01)
*H04B 1/7097* (2011.01)
*H04J 11/00* (2006.01)

(52) U.S. Cl.
CPC ... *H04W 52/0216* (2013.01); *H04W 72/0446* (2013.01); *H04B 1/7097* (2013.01); *H04J 11/0023* (2013.01)

(58) Field of Classification Search
CPC .............. H04W 72/1278; H04W 28/18; H04B 1/7097; H04J 11/0023
See application file for complete search history.

(56) References Cited

U.S. PATENT DOCUMENTS

| | | | |
|---|---|---|---|
| 8,363,674 | B2 | 1/2013 | Surineni et al. |
| 9,258,193 | B2 | 2/2016 | Kasslin et al. |
| 9,800,389 | B2 | 10/2017 | Abraham et al. |
| 10,080,182 | B2 | 9/2018 | Kim et al. |
| 2014/0302787 | A1 | 10/2014 | Rantala et al. |
| 2014/0313966 | A1 | 10/2014 | Shukla et al. |
| 2015/0036540 | A1 | 2/2015 | Kasslin et al. |
| 2015/0319675 | A1 | 11/2015 | Park et al. |
| 2015/0319695 | A1* | 11/2015 | Huang .............. H04W 52/0216 370/311 |
| 2016/0165653 | A1* | 6/2016 | Liu ...................... H04L 67/325 370/329 |
| 2017/0094496 | A1 | 3/2017 | Aoki |

FOREIGN PATENT DOCUMENTS

| | | |
|---|---|---|
| CN | 105122852 A | 12/2015 |
| JP | 2009-523372 A | 6/2009 |
| JP | 2015-170942 A | 9/2015 |
| KR | 10-2009-0003181 A | 1/2009 |
| RU | 2388044 C2 | 4/2010 |
| WO | 2015152657 A1 | 10/2015 |

OTHER PUBLICATIONS

Camps-Mur et al., "Enabling Always On Service Discovery: WiFi Neighbor Awareness Networking", Apr. 2015, pp. 118-125 (Year: 2015).*
Hitoshi Aoki, U.S. Appl. No. 15/744,484, filed Jan. 12, 2018.
Hitoshi Aoki, U.S. Appl. No. 16/015,433, filed Jun. 22, 2018.
Chinese Office Action dated Sep. 30, 2020, in related Chinese Patent Application No. 201680071110.4 (with English translation).
Russian Office Action dated Apr. 29, 2019, in related Russian Patent Application No. 2018123951 (with English ranslation).
Japanese Office Action dated Aug. 2, 2019, in related Japanese Patent Application No. 2015-236993.
Indian Office Action dated Sep. 26, 2020, in related Indian Patent Application No. 201847023918.
Notification of Transmittal of the International Search Report and the Written Opinion dated Feb. 6, 2017, in International Application No. PCT/JP2016/083535.
WiFi Alliance, "Neighbor Awareness Networking Technical Specification Version 1.0", 2015.
Korean Office Action dated Aug. 9, 2019, in related Korean Patent Application No. 10-2018-7018003.

* cited by examiner

COMMUNICATION APPARATUS HAVING OVERLAPPING PERIODS FOR COMMUNICATION WITH OTHER COMMUNICATION APPARATUSES, METHOD OF CONTROLLING THE SAME, AND NON-TRANSITORY COMPUTER-READABLE STORAGE MEDIUM

TECHNICAL FIELD

The present invention relates to a communication apparatus, a method of controlling the same, and a program.

BACKGROUND ART

A wireless LAN (Local Area. Network) system represented in IEEE 802.11 is widely used. In a wireless LAN, a network is controlled by a base station called an access point (hereinafter, AP). A wireless network is configured by this AP and a station which exists within the coverage area of the AP and is in a wireless connection state. In recent years, in addition to simple wireless network configurations according to these kinds of conventional APs and STAs, various wireless LAN network configuration products and specification standards are appearing.

In U.S. Patent Application Publication No. 2014/302787, Neighbor Awareness Networking (NAN) by Wi-Fi Alliance is recited as a standard of communication for discovering a communication apparatus and services and the like that the communication apparatus provides with reduced power consumption. Note, an NAN service name is Wi-Fi Aware. In an NAN, the communication apparatuses which configure the NAN (hereinafter, NAN devices) synchronize a period in which information is exchanged. Because of this, a time at which a wireless RF is made to be active can be shortened and power saving can be realized. In the NAN, a period for the synchronization is called a Discovery Window (DW). Also, a collection of NAN devices among which a predetermined synchronization period is shared is called an NAN cluster.

The NAN device can handle any of the roles such as Master, Non-Master Sync, and Non-Master Non-Sync within the NAN cluster. A terminal having the role of Master transmits a Sync Beacon, which is a signal for making each NAN device of the same NAN cluster synchronize, in a DW period. Also, each NAN device within the NAN cluster transmits/receives Subscribe messages, which are signals for searching for a service, or Publish messages, which are signals for making a notification that a service is provided, with each other in the DW period after having synchronized. Furthermore, each NAN device can exchange Follow-up messages for exchanging additional information relating to a service in the DW period. A frame configuration of a message such as a Publish message, a Subscribe message, and a Follow-up message is defined by the NAN standard and is called a Service Discovery Frame (SDF). In an SDF, a Service ID, which is an identifier for identifying a target service, is included. Discovery/detection of a service can be performed by NAN devices mutually exchanging SDFs.

Discovery/detection of a service can be performed by NAN devices in an NAN cluster. However, the NAN devices must establish a PostNAN rather than an NAN in a case of performing communication of an application for executing the actual service after discovery/detection a service. A PostNAN is a network that is different to an NAN cluster, in other words a network that is different to an NAN such as an Infra network, an IBSS, Wi-Fi Direct, or the like. The NAN device becomes capable of performing communication according to the application by establishing the PostNAN network.

In this way, an NAN device can use a PostNAN to perform communication of an application for implementing the actual service after the service is detected by performing service detection in the NAN cluster. However, conventionally, power saving or optimization in the communication which is executed in a period different to the DW of a PostNAN or the like is not considered. For example, in a case in which communication by an application with a plurality of NAN devices is individually established, it is necessary to perform communication with the plurality of NAN devices respectively in different periods, and room for improvement exists regarding power saving or optimization.

SUMMARY OF INVENTION

In one aspect, a communication apparatus comprises: first communication means for, in a Neighbor Awareness Networking (NAN) Discovery Window (DW), communicating with another communication apparatus that belongs to an NAN cluster to which the communication apparatus belongs; second communication means for communicating with another communication apparatus belonging to the NAN cluster in a period other than the DW; and determination means for determining a schedule for communicating by the second communication means, wherein, when a schedule for communicating with a first other communication apparatus has been determined by the determination means, in a case of communicating by the second communication means with a second other communication apparatus different to the first other communication apparatus, the determination means determines a schedule for communicating with the second other communication apparatus so that a period for communicating by the second communication means with the first other communication apparatus and a period for communicating by the second communication means with the second other communication apparatus at least partially overlap.

In another aspect, a communication apparatus comprises: first communication means for performing communication of service information in a periodic first period in a network; second communication means for performing communication for executing a service that the service information communicated by the first communication means indicates in a period other than the periodic period; determination means for determining a schedule for communicating by the second communication means, wherein, when a schedule for communicating with a first other communication apparatus has been determined by the determination means, in a case of communicating by the second communication means with a second other communication apparatus different to the first other communication apparatus, the determination means determines a schedule for communicating with the second other communication apparatus so that a period for communicating by the second communication means with the first other communication apparatus and a period for communicating by the second communication means with the second other communication apparatus at least partially overlap.

In another aspect, a method of controlling a communication apparatus includes, in a Neighbor Awareness Networking (NAN) Discovery Window (DW), performing a first communication with another communication apparatus that belongs to an NAN cluster to which the communication apparatus belongs; performing a second communication with another communication apparatus belonging to the NAN cluster in a period other than the DW; and determining a schedule for the second communication, wherein, when a schedule for communicating with a first other communication apparatus has been determined, in a case of the second communication with a second other communication apparatus different to the first other communication apparatus, a schedule for communicating with the second other communication apparatus is determined so that a period for the second communication with the first other communication apparatus and a period for the second communication with the second other communication apparatus at least partially overlap.

In other another aspect, a method of controlling a communication apparatus includes: performing a first communication of service information in a periodic first period in a network; performing a second communication for executing a service that the service information communicated by the first communication indicates in a period other than the periodic period; determining a schedule for the second communication, wherein, when a schedule for communicating with a first other communication apparatus has been determined, in a case of the second communication with a second other communication apparatus different to the first other communication apparatus, a schedule for communicating with the second other communication apparatus is determined so that a period for the second communication with the first other communication apparatus and a period for the second communication with the second other communication apparatus at least partially overlap.

Further features of the present invention will become apparent from the following description of exemplary embodiments (with reference to the attached drawings).

DESCRIPTION OF EMBODIMENTS

Below, with reference to the attached drawings, a detailed description is given for the present invention based on embodiments. Note that configurations illustrated in the following embodiments are merely examples, and the present invention is not limited to the illustrated configurations.

Embodiment 1

Figure 1:
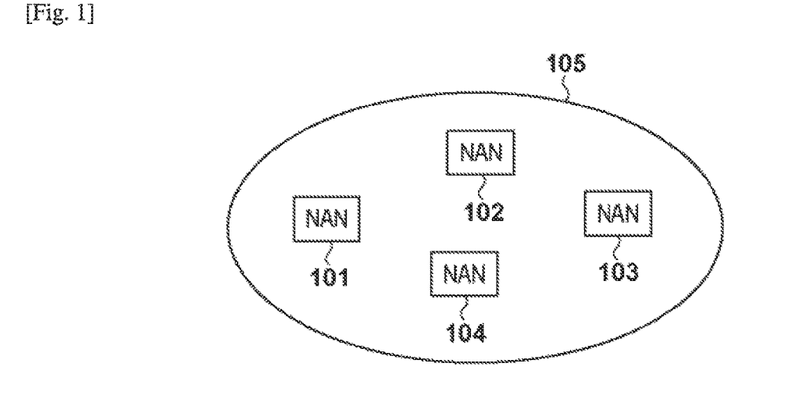
FIG. 1 schematically illustrates a wireless network configuration in an embodiment.

FIG. 1 illustrates a network configuration example in the present embodiment. Hereinafter, description will be given regarding an example which uses a wireless LAN system conforming to the Neighbor Awareness Networking (NAN) standard.

NAN devices 101, 102, 103, and 104 are wireless communication apparatuses conforming to the NAN standard to which the present embodiment is applied. Note, the NAN devices 101, 102, 103, and 104 may be any device if capable of joining an NAN and capable of performing communication by an application. The NAN devices 101, 102, 103, and 104, based on the NAN standard, are capable of discovering a communication apparatus in the periphery and services provided thereby, and are capable of provisioning services. In FIG. 1, the NAN devices 101, 102, 103, and 104 join an NAN cluster 105. The NAN devices 101, 103, and 104 join the NAN cluster 105 as Non-Master Syncs, and the NAN device 102 joins the NAN cluster 105 as a Master or an Anchor Master. In the present embodiment, the NAN device 101 is a Subscriber which searches for a predetermined service. Also, the NAN device 103 is a Publisher capable of providing a predetermined service that the NAN device 101 searches for.

The NAN cluster 105 is a network that the NAN devices 101, 102, 103, and 104 join. In the present embodiment, NAN devices which join the NAN cluster 105 construct a network on channel 6. Within the network of the NAN cluster 105, the Discovery Window (DW) which is a periodic communication period is 16 TU (Time Unit), and there is an interval of 512 TU from the head of a DW to the head of the next DW. Note that configuration of the DW and the wireless channel of the NAN are not limited to these.

Figure 2:
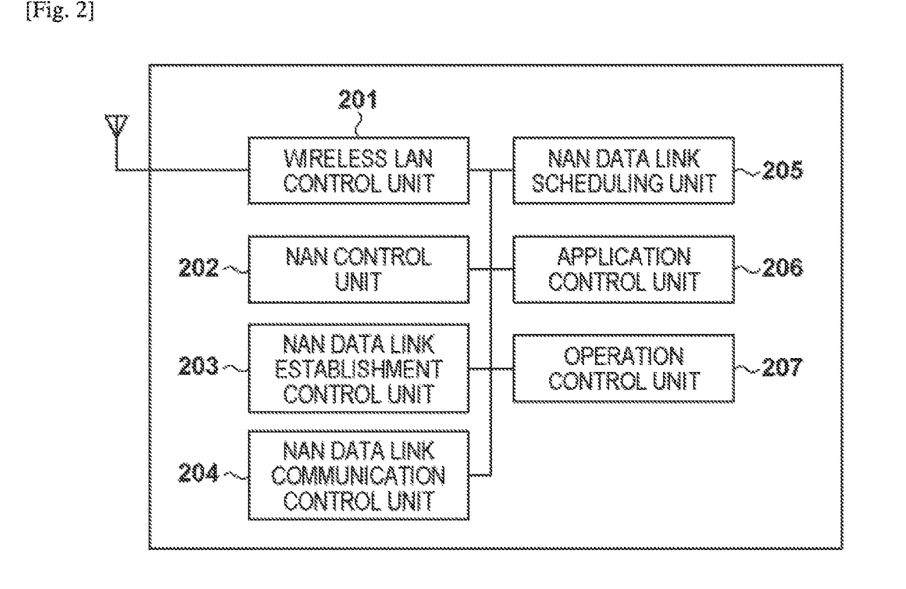
FIG. 2 schematically illustrates a functional configuration of an NAN device in an embodiment.

FIG. 2 schematically illustrates a functional configuration of the NAN device 101. Note, the functional configuration of the NAN devices 102, 103, and 104 is the same as that of the NAN device 101. A wireless LAN control unit 201 performs control for performing transmission/reception of wireless signals with another wireless LAN device. Also, the wireless LAN control unit 201 performs control of the wireless LAN in accordance with IEEE 802.11. An NAN control unit 202 performs control in accordance with the NAN standard. An NAN data link establishment control unit 203 controls the NAN control unit 202 and performs control for establishing a data link layer in an OSI reference model for communicating by an application with another NAN device. The NAN device 101 becomes capable of performing data communication by an application when a data link layer is established by processing of the NAN data link establishment control unit 203. In the present embodiment, as an example, the NAN device 101 is assumed to become capable of communication by IPv6 after a data link is established.

An NAN data link communication control unit 204 uses the data link layer established by the NAN data link establishment control unit 203 to control communication by the application. The NAN device 101 becomes capable of performing transmission/reception (specifically, communication of application data) of IPv6 packets by control of the NAN data link communication control unit 204.

An NAN data link scheduling unit 205, when establishment of the data link layer is performed by the NAN data link establishment control unit 203, controls to schedule with a communication partner at what timing communication by the application is executed. The NAN data link communication control unit 204 performs communication of application data at the timing scheduled by the NAN data link scheduling unit 205. Detailed processing of the scheduling is described in FIG. 7.

An application control unit 206 performs control for executing a service discovered by the NAN. For example, if the NAN device 101 discovers a print service, the application control unit 206 performs control for executing an application which requests a print job. Also, if the NAN device 101 discovers a photograph sharing service, the application control unit 206 performs control for executing an application which exchanges photograph data. The NAN device 101 searches for a plurality of services and can have a plurality of the application control unit 206. In the present embodiment, a chat application is executed as an application between the NAN device 101 and the NAN device 103 as an example. A user (not shown) of the NAN device 101 searches for a partner to chat with on the chat application. Also, a user (not shown) of the NAN device 103 waits for a chat partner on the chat application. Also, in the present embodiment, the chat application is performed via communication using IPv6. An operation control unit 207 manages operations performed in relation to an input unit 304 (FIG. 3) by the user of the NAN device 101 and transfers necessary signals to other controls units 201 to 206.

Figure 3:
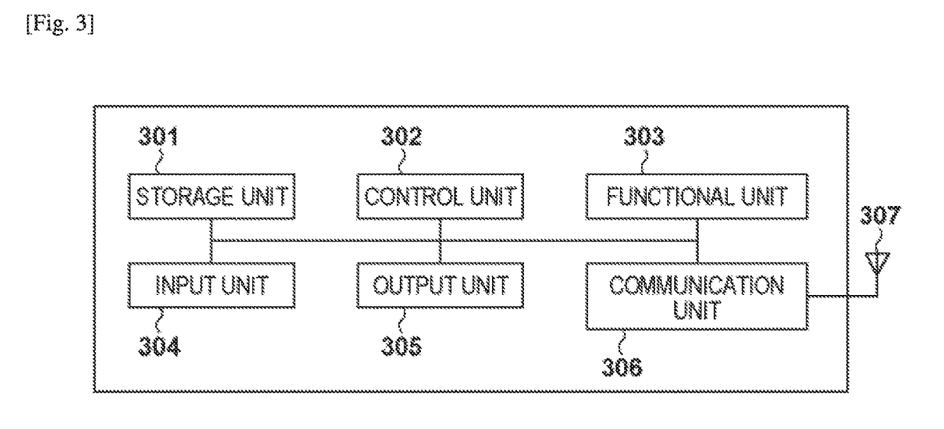
FIG. 3 schematically illustrates a hardware configuration of an NAN device in an embodiment.

FIG. 3 schematically illustrates a hardware configuration of the NAN device 101. Note, the hardware configuration of the NAN devices 102, 103, and 104 is the same as that of the NAN device 101. A storage unit 301 may be configured by both a ROM (Read Only Memory) and a RAM (Random Access Memory) or by one of them, and stores programs for performing various operations described later and various kinds of information such as communication parameters for wireless communication. Note, other than memory such as a ROM and a RAM, a storage medium such as a flexible disk, a hard disk, an optical disc, a magneto-optical disk, a CD-ROM, a CD-R, a magnetic tape, a non-volatile memory card, and a DVD may be used as the storage unit 301.

A control unit 302 is configured by a CPU (Central Processing Unit) or an MPU (Micro Processing Unit) and controls the entire NAN device 101 by executing a program stored in the storage unit 301. Note, the control unit 302 may control the entire NAN device 101 by cooperation between a program stored in the storage unit 301 and an OS (Operating System). Also, the control unit 302 controls a functional unit 303 to execute predetermined processing such as imaging, printing, or projecting.

The functional unit 303 is hardware for the NAN device 101 to execute predetermined processing. For example, if the NAN device 101 is a camera, the functional unit 303 is an image capturing unit and performs image capturing processing. For example, if the NAN device 101 is a printer, the functional unit 303 is a print unit and performs print processing. For example, if the NAN device 101 is a projector, the functional unit 303 is a projection unit and performs projection processing. Data that the functional unit 303 processes may be data stored in the storage unit 301 and may be data which is communicated with another NAN device, via a communication unit 306 described later.

The input unit 304 performs acceptance of various operations from the user. An output unit 305 performs various output to the user. Here, output by the output unit 305 contains at least one display on a screen, audio output by a speaker, a vibration output or the like. Note, both the input unit 304 and the output unit 305 may be realized by a single module as with a touch panel.

The communication unit 306 performs control of wireless communication conforming to the IEEE 802.11 series and control of IP (Internet Protocol) communication. Also, the communication unit 306 controls an antenna 307 to perform transmission/reception of wireless signals for wireless communication. The NAN device 101 communicates content such as image data, document data, and video data with other NAN devices via the communication unit 306.

Figure 4:
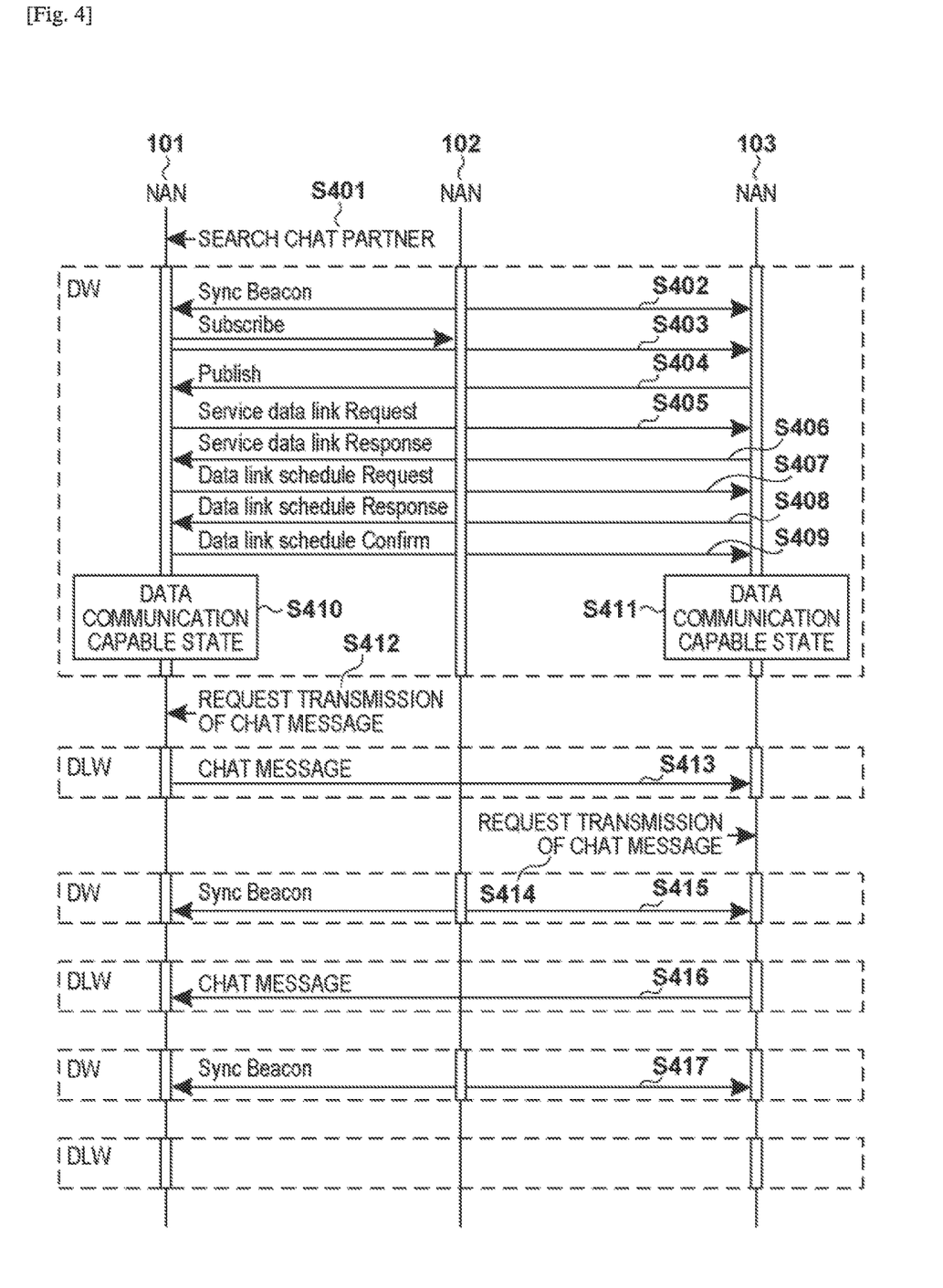
FIG. 4 is the sequence diagram for illustrating a flow of a communication process in the embodiment.

In FIG. 4 in the present embodiment, a flow of a sequence of a discovery of a service, an establishment of a data link by an NAN, and application communication processing by the data link of the NAN is illustrated in a sequence diagram. A situation in which processing for the NAN device 101 searching for a chat partner in a chat application, and the NAN device 103 waiting for a chat partner in the chat application is executed is envisioned. The NAN device 102 causes an application other than the chat application to operate.

Firstly, the user of the NAN device 101 causes processing for searching for a chat partner to start in the chat application via the input unit 304 (step S401). The NAN device 102 makes a notification of the DW period for performing communication of a message including service information by a Sync Beacon (step S402). The NAN device 101 does not transmit messages until the DW period even if the search process has started.

The NAN device 101 transmits a Subscribe message in order to search for the chat application by a broadcast upon the DW period (step S403). At that time, an ID which indicates the chat application is designated as a Service ID included in the Subscribe message in order to indicate a search for the chat application. Here, the Service ID indicating the chat application is assumed to be 10. The NAN device 103 responds to the NAN device 101 in a Publish message indicating that the chat application is operating when the Subscribe message for searching for the chat application is received (step S404). At that time, 10, which is the Service ID indicating the chat application, is designated in the Service ID of the Publish message.

When the NAN device 101 receives the Publish message it transmits, within the DW period, a Service data link Request which requests establishment of a data link for making communication by the chat application possible (step S405). At that time, the NAN device 101 can transmit the Service data link Request in the next DW period in a case when the DW period has ended. Alternatively, the NAN device 101 may transmit a Service data link Request in accordance with the information in a case when Further Service Availability is added in the Publish message of step S404. Further Service Availability is information indicating that a service discovery/search outside the DW period is possible.

Figure 5:
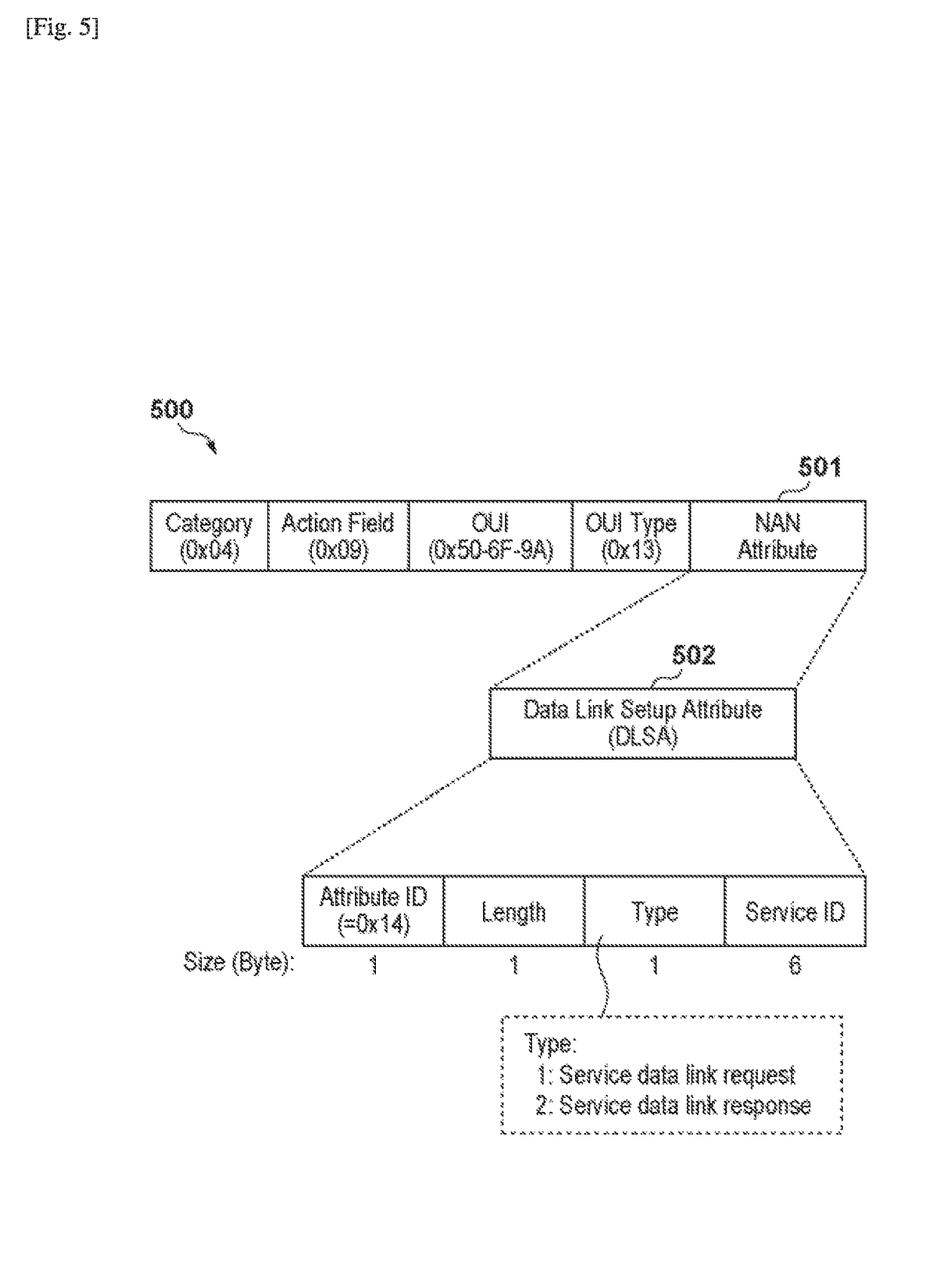
FIG. 5 is a configuration of a Service data link Request/Response in the embodiment.

The SDF in the present embodiment is illustrated in FIG. 5 as an SDF 500. The SDF 500 is something that is an expansion in relation to the SDF of the NAN standard, and a Data Link Setup Attribute (DLSA) 502 is added as NAN Attributes 501. By the DLSA 502 being included in the SDF 500, the NAN device 101 which transmitted the SDF can perform a request for a data link establishment by the NAN.

As illustrated in FIG. 5 in the present embodiment, an Attribute ID in the DLSA 502 is defined to be 0x14. Also, 1 (Service data link Request), which is a numeric value indicating a request to establish a data link in a predetermined service, is designated for a Type. Note, a case in which the Type value is 2 will be described later. For Service ID, a Service ID of a service for which communication using the data link is desired is designated. Specifically, 10, which is the numeric value that indicates the chat application in step S405 of FIG. 4, is designated.

The NAN device 103 responds by a Service data link Response when the Service data link Request is received (step S406). When these exchanges have completed, it is mutually confirmed that a data link communication by the chat application as the service is performed between the NAN device 101 and the NAN device 103. The Service data link Response is illustrated by the format of the SDF 500 of FIG. 5. Unlike Service data link Request, the value of the Type of the DLSA 502 is 2 in the case of the Service data link Response. Also, 10 which is a value indicating the chat application is designated for the Service ID in the Service data link Response similarly to in step S405.

The NAN device 101 and the NAN device 103 determine a timing for performing the data link communication after mutually performing confirmation that the data link communication was executed for the chat application.

The NAN device 101 transmits a Data link schedule Request when the Service data link Response is received (step S407). This is a message for starting a negotiation for determining a schedule for what interval outside of the DW period the data link communication is to be executed in.

Figure 6:
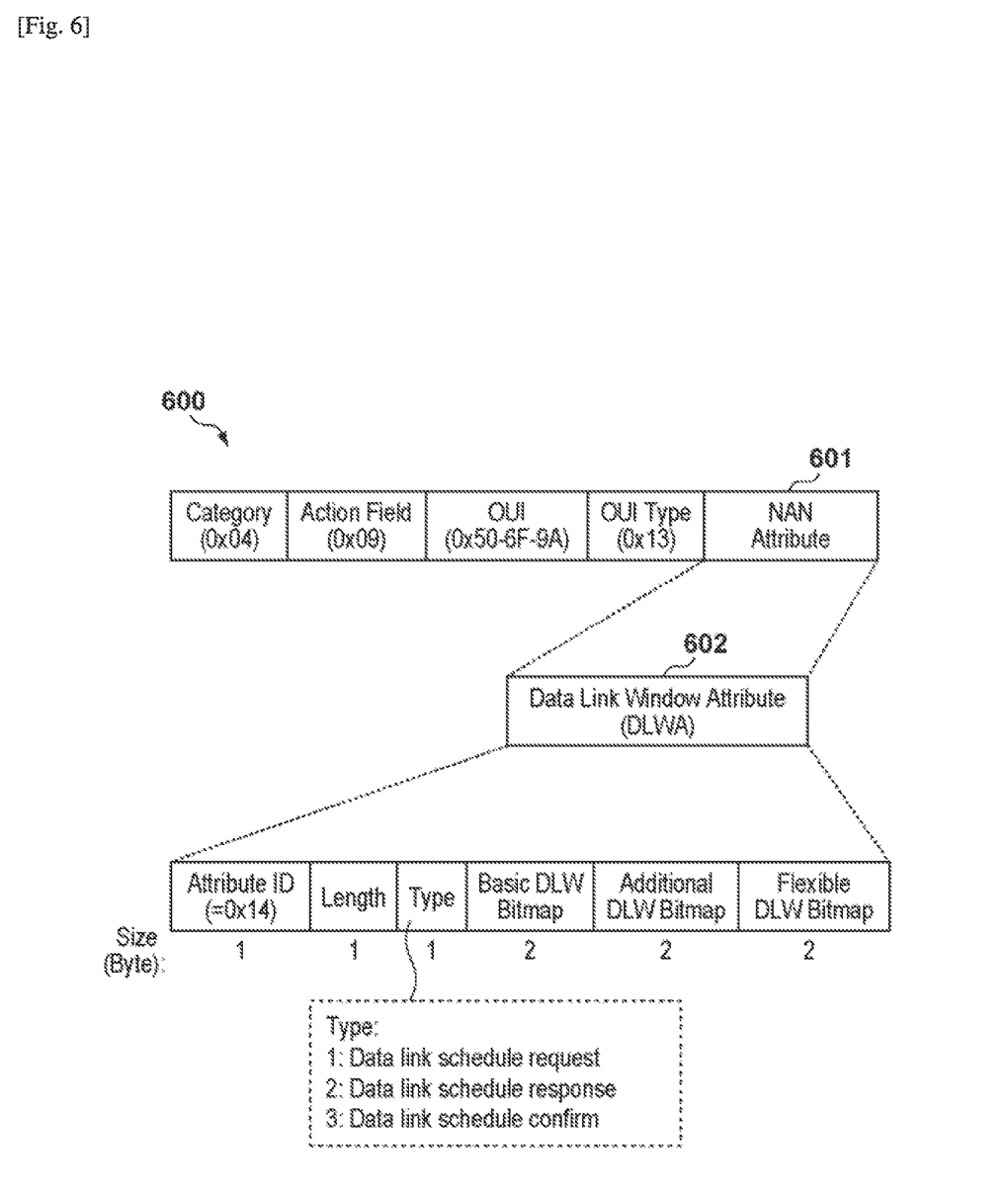
FIG. 6 is a configuration of a Data link schedule Request/Response/Confirm in the embodiment.

In FIG. 6 is a message for negotiating the interval in which the data link communication is executed, and an SDF 600 which is an expansion in relation to an SDF of the NAN standard is illustrated. The SDF 600 is something that is an expansion in relation to the SDF of the NAN standard, and a Data Link Window (DLWA) 602 is added as NAN Attributes 601. By the DLWA 602 being included in the SDF 600, the NAN device 101 which transmits the SDF can perform a negotiation of scheduling of what interval outside the DW period at the time of the data link communication by the NAN to communicate in. A method for determining what interval to actually request the NAN 103 to communicate in is described later using the flowchart of FIG. 7.

As illustrated in FIG. 6 in the present embodiment, an Attribute ID in the DLWA 602 is defined to be 0x14. Also, 1 (service Data link schedule Request) is designated for the Type as a value for requesting a start of scheduling. Note, cases in which the Type value is 2 and 3 will be described later.

In what interval outside of the DW period a data link communication is requested is designated by a Basic DLW Bitmap, an Additional DLW Bitmap, and a Flexible DLW Bitmap.

The data link interval designated by the value of the Basic DLW Bitmap, in a case when a data link is established with one or more NAN devices, is shared with respect to the NAN devices with which the establishment is performed and is an interval for requesting as an interval in which data link communication is performed. Specifically, after establishing a data link with a single NAN device, the same Basic DLW Bitmap may be designated in a case when the NAN device requests establishment of the data link with another NAN device while maintaining the data link as is.

The data link interval designated by Additional DLW Bitmap and Flexible DLW Bitmap values may be values different in each NAN device which establishes a data link. These are designated when the NAN device desires to perform a data link communication for a large amount of data with a particular NAN device and when it does not desire to perform a data link communication with another NAN device in that interval for example.

The Additional DLW Bitmap is data link interval candidates which the NAN device cannot reject in a Data link schedule Confirm which may be transmitted as this confirmation after reception of the Data link schedule Response. Meanwhile, the Flexible DLW Bitmap is data link interval candidates which the NAN device may reject in a Data link schedule Confirm which may be transmitted as this confirmation after reception of the Data link schedule Response. Detailed description will be given later.

Each bit of each DLW Bitmap value may designate how separated a period from the DW period communication by the NAN data link is made to be. Specifically, in a case in which the start of the DW period is made to be 0 TU and immediately after the end of the DW is made to be 16 TU, a DLW Bitmap whose Nth bit is 1 indicates that there is a possibility that communication by the data link in the period of (N+1)×16 TU to (N+2)×16 TU will occur. For example, a DLW Bitmap whose 0 bit is 1 indicates that there is a possibility that communication by the data link will occur in a period from 16 TU to 32 TU, and a DLW Bitmap whose 2nd bit is 1 indicates that there is possibility that communication by the data link in a period from 48 TU until 64 TU will occur. In the DLW Bitmap, 1 may be designated in relation to a plurality of bits. In this way, a period in which communication by a data link is possible in units of the same time span as the DW period may be designated in periods other than the DW. Note, a method of designating a period in which communication by the data link is performed is not limited to the method described above if it is something that designates a period other than the DW period.

FIG. 4 is returned to. The NAN device 103 responds by a Data link schedule Response when the Data link schedule Request is received (step S408). In the Data link schedule Response, 2, which is a value that indicates that the Type of the DLWA 602 is a response to the Data link schedule Request, is designated in the SDF 600. Also, at that time, a period in which the NAN device 103 itself desires to perform a data link communication outside the DW period is indicated in each DLW Bitmap by the same method as the Data link schedule Request. At that time, it is not necessary that each DLW Bitmap necessarily match with each DLW Bitmap of the Data link schedule Request and the NAN 103 device may designate a desired period. However, it becomes possible to start communication in the data link more quickly if each DLW Bitmap matches in the Data link schedule Request and the Data link schedule Response.

The NAN device 101 transmits a Data link schedule Confirm for confirming a period in which it is possible to perform data link communication finally when the Data link schedule Response is received (step S409). In the Data link schedule Confirm, 3 which is a value that indicates that the Type of the DLWA 602 is a response to the Data link schedule Response is designated in the SDF 600.

At that time, the NAN device 101 causes values of a Basic DLW Bitmap and an Additional DLW Bitmap in the Data link schedule Confirm to match values of an Additional DLW Bitmap and a Basic DLW Bitmap of the Data link schedule Response that are received if the values of the Basic DLW Bitmap and the Additional DLW Bitmap of the Data link schedule Response that is received are included in the values of the Basic DLW Bitmap and the Additional DLW Bitmap designated by the Data link schedule Request of step S407, or if they match.

Meanwhile, although the Flexible DLW Bitmap cannot designate something other than values indicated in the Flexible DLW Bitmap of the Data link schedule Response, it is not necessarily required that it matches. For example, it may be a subset thereof. Here, it is assumed that regardless of the NAN device 101 designating the Flexible DLW Bitmap in the Data link schedule Request by 0x4 in step S407, 0x5 is designated in the Data link schedule Response in step S408. At that time, the NAN device 101 returns the Flexible DLW Bitmap as 0x0 because the mutually desired periods for the data link communication do not match.

When the NAN device 101 responds in the Data link schedule Confirm making Basic DLW the period from 32 to 48 TU, and Additional DLW the period from 48 to 64 TU, the NAN device 103 and the NAN device 101 agree by executing a data link communication in a period of 32 TU after 16 TU from immediately after the DW period.

The data link of the NAN is established and the NAN device 101 and the NAN device 103 both enter a state in which they can communicate according to the chat application (step S410 and step S411). Then, transmission/reception of wireless packets is executed in the DLW period designated in the Data link schedule Confirm rather than just in the DW period thereafter. Specifically, the NAN device 101 and the NAN device 103 become capable of performing communication by the data link in a state in which communication in the DW period can continue.

A state in which chat is possible is entered, and the user of the NAN device 101 makes a request for transmission of a chat message (step S412). By this, the NAN device 101 transmits the chat message from the DLW period to the NAN device 103 (step S413). The NAN device 103 makes a notification of the chat message to the user of the NAN device 103 when the chat message is received. The user of the NAN device 103 having seen this makes a request for transmission of a chat message (step S414). Then the NAN device 103 transmits the chat message from when the DLW period is reached (step S416). Here, the NAN device 102 is illustrated as something that transmits a Sync Beacon when the DW period occurs during the time from when the request for transmission of the chat message is made until the actual transmission of the chat message (step S415 and step S417).

In this way, by using an interval other than the DW period, the NAN device 101 becomes capable of quickly starting a data link communication for executing a service with another communication apparatus capable of executing a desired service. However, by the NAN device 101 establishing one-to-one communication outside the DW period by the above described procedure, the following two problems occur when trying to communicate by the application in the data link with the plurality of the NAN devices respectively.

The first problem is that there may arise the necessity to set a state in which data reception is possible in order to perform data transmission/reception in a plurality of time periods other than the DW period if the NAN device 101 determines individually the periods in which to perform communication by the application outside of the DW period with a plurality of NAN devices. For this reason, there is the possibility that in the NAN device 101, if performance of communication by the application with a plurality of NAN devices is attempted, the time periods in which data reception is possible will increase, and power consumption will become larger. It is desirable to be able to reduce power consumption as much as possible even if the NAN device 101 established a data link to perform communication by an application with a plurality of NAN devices.

The second problem is that there is the possibility that communication by broadcasting would become inefficient if a data link were established such that time periods in which the communication by the application with the plurality of NAN devices is performed were different. For example, if the NAN device 101 transmits a message of the same application communication to the plurality of NAN devices with which a data link is established, there would be the possibility that the same message is transmitted in proportion to the number of NAN devices with a data link is established. This is inefficient from the perspective of power consumption and radio wave usage efficiency.

Accordingly, in the present embodiment, the NAN device 101 determines the timing for performing data link communication in accordance with the following procedure.

Figure 7:
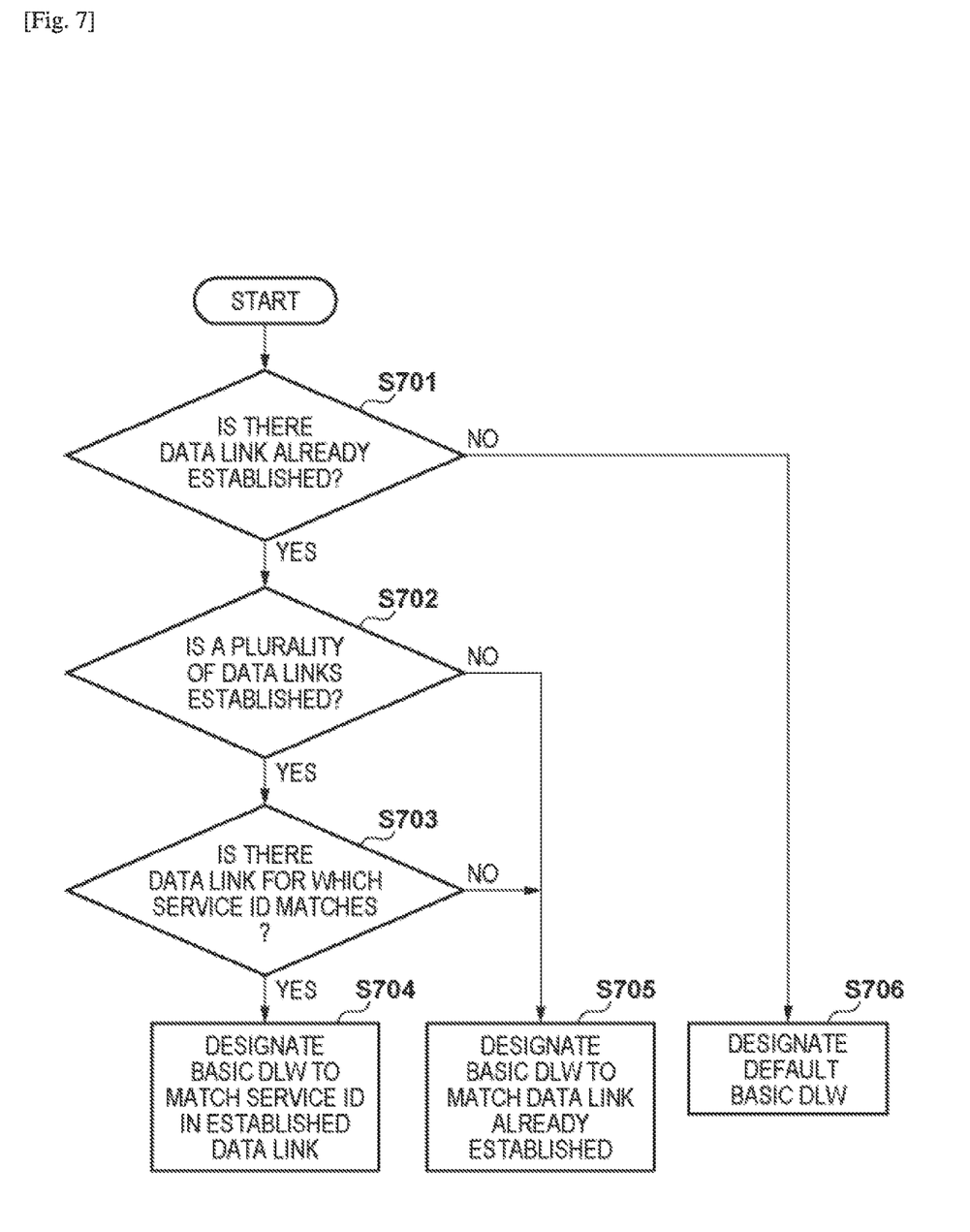
FIG. 7 is a flowchart of Basic D determination processing of a Data link schedule Request in the embodiment.

FIG. 7 is a flowchart for determining a timing at which to perform a data link communication in the present embodiment. Specifically, it is a flowchart for processing for the NAN device 101 to determine a value of the Basic DLW Bitmap in the Data link schedule Request of step S407 of FIG. 4. Note that it is not necessary to determine the Additional DLW Bitmap and the Flexible DLW Bitmap based on the flowchart of FIG. 7 because timing is arranged such that it is possible to communicate at different timings for each NAN device.

In the present embodiment, based on the network configuration described using FIG. 1, firstly, the NAN device 101 that requests the establishment of the data link discovers an NAN device that is a destination for establishment of a data link in the NAN cluster 105. Then the NAN device 101 transmits a request for establishment of the actual data link, and receives a response to that request. By this, the data link is established. This processing is started by a service search corresponding to the chat application being started in the NAN device 101 by a user operating the input unit 304 of the NAN device 101 irrespective of whether or not a data link is established (irrespective of whether or not a connection by a data link is being maintained). Below, description is given as processing of the NAN device 101, but it is possible for the other NAN devices of the NAN cluster 105 to perform similar processing.

Firstly, the NAN data link scheduling unit 205 of the NAN device 101 confirms whether a data link that it already established exists (step S701). If there is an NAN device for which a data link was already established, the processing proceeds to step S702 in order to enable the application to communicate at the same timing as the data link that was already established.

Meanwhile, if no data link is established with any NAN device yet (No in step S701), the NAN data link scheduling unit 205 designates a default value for Basic DLW Bitmap without considering communication with any NAN device (step S706). For example, the NAN data link scheduling unit 205 designates the value 0x1 which expresses immediately after the DW as the default value of the Basic DLW Bitmap. This is because it is possible to reduce a processing load due to RF control since by the NAN device 101 performing communication by the data link immediately after the DW, it ceases to be necessary to turn off the RF control after the DW finishes, and to turn on the RF control immediately prior to Basic DLW, Also, because each NAN device in the NAN cluster 105 receives a Sync Beacon in the DW, there is a high possibility that misalignment of a timing of individual NAN devices immediately thereafter will be small. Because of this, if there is a slight misalignment in the control of the timer of each NAN device, for example, it becomes harder for a packet to be lost when the NAN device on the transmitting side transmits a packet irrespective of the fact that the NAN device on the receiving side has the RF off, and the NAN device on the receiving side fails to receive it.

If there is an already established data link (Yes in step S701), the NAN data link scheduling unit 205 next confirms whether a plurality of data links are established (step S702). At this point, if the NAN device 101 has established a data link with only one NAN device (No in step S702), the NAN data link scheduling unit 205 designates a Basic DLW which is the same as that data link (step S705). Note that as the method for designating a Basic DLW of a data link that is established, if the Service data link Response received when the NAN device 101 establishes the data link is configured so as to include a Basic DLW in the Service ID field, that Basic DLW may be designated. Also, when the data link is established, if it is possible to receive Basic DLW information, the received Basic DLW may be designated. Also, in the schedule determined in step S705, the Basic DLW may be designated so that at least a portion overlaps (i.e., at least partially overlaps) even if it not all data link intervals are designated to be identical to the data link that is established.

By this, the possibility that it is also possible to communicate by the same Basic DLW in the case where a data link with another NAN device is established becomes higher, that is, it is possible to reduce the time in which reception control is made active in order to communicate by the application. Also, it is possible to optimize power consumption for communication by the application. Meanwhile, if data links are already established with a plurality of NAN devices (Yes in step S702), the processing proceeds to step 5703 in order to determine which NAN device among these to select the same Basic DLW as.

If the NAN device 101 has established data links with a plurality of NAN devices (Yes in step S702), the NAN data link scheduling unit 205, from these, confirms whether or not there is a data link over which communication is being performed using the same Service ID as the data link that it is attempting to establish (step S703). If there is a data link for which the Service ID matches, the NAN data link scheduling unit 205 determines to transmit a Data link schedule Request by designating a value of the Basic DLW that is the same as the data link of that Service ID (step S704). Also, in the schedule determined in step S704, the Basic DLW may be designated so that at least a portion overlaps even if it not all data link intervals are designated to be identical to the data link that is established.

By virtue of this processing, transmission/reception of data by an application in the same intervals as a plurality of other NAN devices with which communication is attempted by the same application becomes possible. With this, it ceases to be necessary to transmit the same message a plurality of times by broadcasting in the Basic DLW. For example, it is possible to reduce power consumption in proportion to the reduction in the number of messages because it is sufficient to send a single message only one time if the NAN device wishes to send the same message to a plurality of partners such as in a chat application. Also, since one messages suffices, radio wave usage also need only be a minimum. Accordingly, it is possible to optimize radio wave usage when broadcast communication is performed, and to reduce power consumption.

Meanwhile, if an already established data link for which the Service ID matches does not exist in step S703 (No in step S703), the processing proceeds to step S705. Specifically, the NAN data link scheduling unit 205 determines to transmit the Data link schedule Request using the same value as the Basic DLW for any of the already established data links (step S705). Note that in such a case, a Basic DLW for which the number of apparatuses sharing the same Basic DLW is the maximum may be selected and set. Also, the Basic DLW whose frequency of communication is the highest may be selected and set.

In the processing of step S704 from step S703 and of step S705 from step S703, there may arise cases in which the NAN device 101 selects one from a plurality of Basic DLWs. In such a case, the NAN data link scheduling unit 205 can select the Basic DLW of a data link that more other NAN devices have established among a plurality of Basic DLWs. In such a case, for example, the possibility is raised that there will still be present an NAN device that has established the same Basic DLW, even if the NAN device 101 disconnected connections with some NAN devices for which a data link is already established. For this reason, the NAN device 101 can maintain active communication, and the possibility that power consumption can be reduced becomes higher.

Also, the NAN device 101 may determine the selected Basic DLW in accordance with a Master Preference of an NAN device that establishes a data link. Note, the Master Preference indicates an easiness of becoming an NAN device Master. This value is a value that each terminal can set freely. An NAN device for which the Master Preference value is large has a high possibility of being present for a long period in an NAN cluster. For this reason, the possibility becomes greater that stable communication will continue by the NAN device 101 selecting the same Basic DLW as the data link that an NAN device for which there is a higher possibility of stable data link communication establishes. The result of this is that the possibility that power consumption can be reduced will be higher.

Also, the NAN device 101 may select the same Basic DLW as the data link used for communication of a service or an application that is of a high priority to the NAN device 101 from out of the data links that are already established. A higher priority application means, for example, an application that a user uses frequently, or an application that has been operating for a long time. Also, the NAN device 101 may select the same Basic DLW as an NAN device that is connecting more frequently or an NAN device that is establishing a long period data link.

Next, processing of FIG. 7 is described using a concrete example. Here, an example is considered in which the NAN device 101, in order to perform communication in a chat application, requests establishment of a data link with respect to the NAN device 103. Note, the default Basic DLW is assumed to be 0x1. In such a case, firstly, the NAN device 101 designates 0x1 which is the default Basic DLW in accordance with the processing of step S701 and step S706 if no data link is established with another NAN device.

The NAN device 101 designates the same Basic DLW as a data link with the NAN device 102 that is already established in accordance with the processing of step S701, step S702, and step S705 if a data link has been established with only the NAN device 102. By this, the NAN device 101 can communicate with the NAN device 103 in an interval in which transmission/reception for data link communication outside of the DW period is already being performed, and can thereby achieve a reduction in power consumption.

Also, a situation in which the NAN device 101 establishes two data links—a data link for the chat application with the NAN device 102 and a data link for a photograph sharing service with the NAN device 104—is considered. Assume the NAN device 101 has established a data link with the NAN device 102 where the Basic DLW is 0x2, and has established a data link with the NAN device 103 where the Basic DLW is 0x3. Here, the NAN device 101 determines that the Service IDs match between the data link attempting to be established by the NAN device 103 and the data link established by the NAN device 102 because the NAN device 102 and the NAN device 103 are attempting to perform communication in the same chat application. For this reason, the NAN device 101 determines to request that a data link with the NAN device 103 be established by the value of 0x2 for the Basic DLW of the data link of the NAN device 102 for which the Service IDs match in accordance with the processing of step S701, step S702, step S703, and step S704.

Also, a situation in which the NAN device 101 establishes two data links—a data link for a print service with the NAN device 102 and a data link for a photograph sharing service with the NAN device 104—is considered. Assume the NAN device 101 has established a data link with the NAN device 102 where the Basic DLW is 0x2, and has established a data link with the NAN device 104 where the Basic DLW is 0x3, In such a case, a plurality of data links are established, and there is no data link over which the same application is communicating, that is, there is no data link for which the Service IDs match. Accordingly, the NAN device 101 selects the same Basic DLW as the data link of one of the NAN device 102 and the NAN device 104 in accordance with the processing of step S701, step S702, step S703, and step S705. In such a case, it is advantageous that the NAN device 101 make the determination from the values of the Master Preference of the NAN device 102 and the NAN device 104 as described previously. The NAN device 101 designating the same Basic DLW as the established data link whose Master Preference is higher means that the same Basic DLW as the NAN device for which the possibility of continuing to communicate stably is higher is designated.

Figure 8:
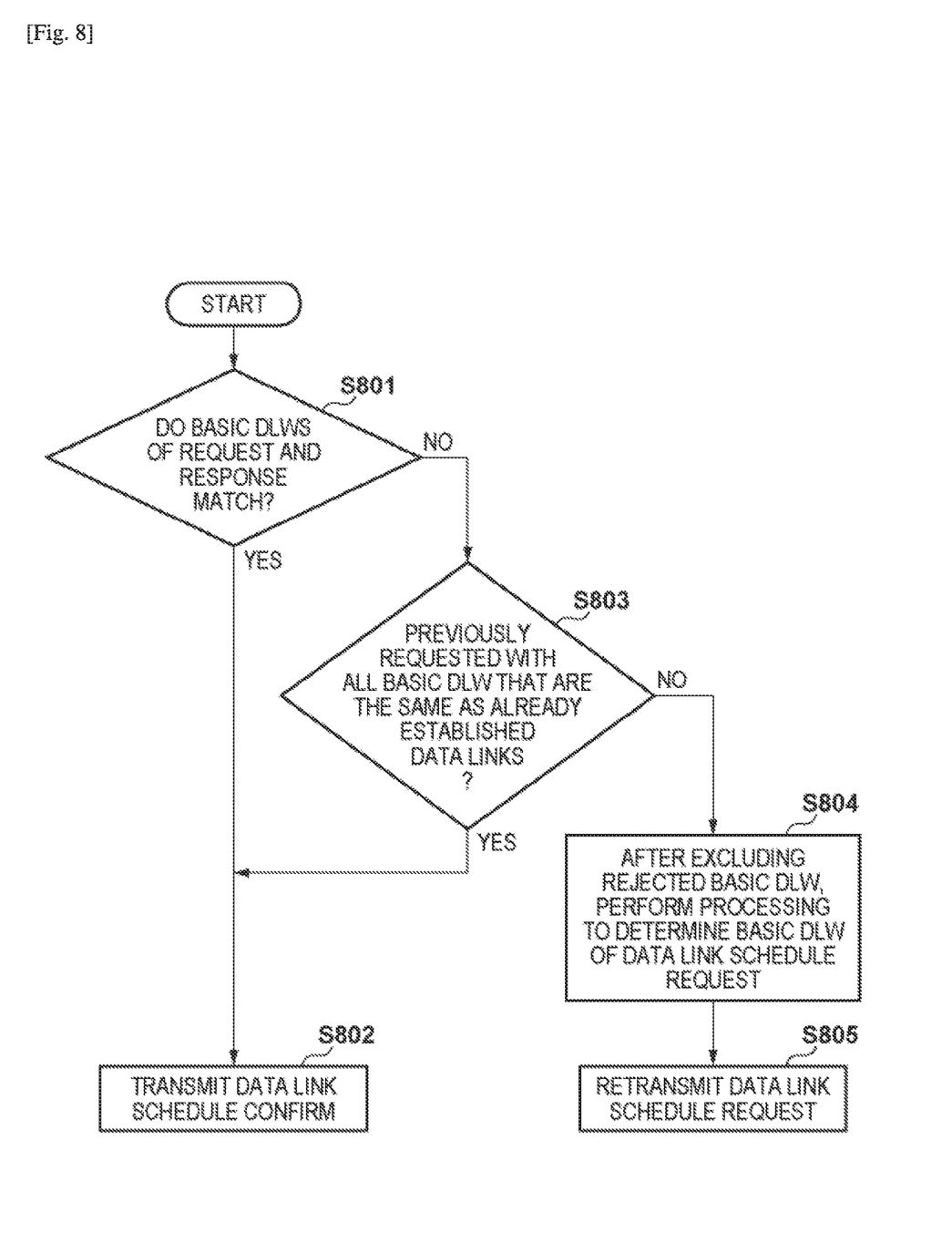
FIG. 8 is a flowchart of reception processing of a Data link schedule Response in the embodiment.

Next, description is given of a case in which the Basic DLW of the Service data link Request received in step S408 of FIG. 4 is different to the Basic DLW of the Service data link Request transmitted in step S407. The processing here is described by FIG. 8. FIG. 8 is a flowchart of reception processing of a Data link schedule Response in the embodiment.

Firstly, the NAN data link scheduling unit 205 of the NAN device 101 compares the Basic DLW of the Data link schedule Response that was received with the Basic DLW of the Data link schedule Request that the NAN device 101 transmitted (step S801). The Basic DLW of the Data link schedule Response indicates a period in which the NAN device 103 can communicate. If these match (Yes in step S801), the NAN data link scheduling unit 205 transmits a Data link schedule Confirm in order to establish a data link communication by the presented Basic DLW (step S802). Note that in the processing of step S801, it is not required that both Basic DLWs completely match, and if there is a period in which the Basic DLW of the Data link schedule Request and the Basic DLW of the Data link schedule Response match, Yes is determined.

Meanwhile, in the case where the Basic DLWs do not match (No in step S801), the NAN data link scheduling unit 205 transitions to processing for designating a Basic DLW for which a data link has been established with another NAN device and retransmitting a Data link schedule Request. The NAN device 101, even if a first presented Basic DLW is rejected (does not match), if another data link is established with an NAN device, and if it is possible to designate that Basic DLW to establish a data link, there ceases to be a need to perform reception control in another Basic DLW, and as a consequence, it is possible to reduce power consumption.

Specifically, the NAN data link scheduling unit 205 first confirms whether or not the Data link schedule Request was transmitted in a state in which any Basic DLW that is the same as an already established data link was designated (step S803). If establishment of a data link with any Basic DLW was tried already, the NAN device 101 gives up on causing the Basic DLW of the data link that it is attempting to establish newly and the Basic DLW of a data link that is already established to match, and transmits the Data link schedule Confirm (step S802). At that time, a Basic DLW designated in the Data link schedule Response is designated.

If No in step S803, the NAN data link scheduling unit 205 executes processing of FIG. 7 after excluding the data link of a Basic DLW that was rejected previously (step S804). The NAN data link scheduling unit 205 designates the Basic DLW of the result of that and retransmits the Data link schedule Request (step S805). By this, even if a first presented Basic DLW is rejected, if a data link with an NAN device is established otherwise, the possibility of establishing a new data link by the same Basic DLW as that Basic DLW will increase for the NAN device 101. The consequence of this is that it will be possible to achieve a reduction of power consumption.

As described above, in the present embodiment, a schedule for communicating with a second NAN device is determined so that there is overlapping of at least a portion of the periods in which communication is performed outside of the DW period between the second NAN device and a first NAN device for which a schedule has been determined previously. Accordingly, it becomes possible to perform optimization or power saving in the communication executed in a period different to the DW.

Variation

In FIG. 4, a data link is established by a two stage negotiation of what service communication by an application is started in, and then whether to perform communication by the application in that schedule (step S405 to step S409). Configuration may be taken so as to negotiate this by a message of one type. In other words, it may be indicated which service it is desired to start communication by the application in by including a DLSA in a Data link schedule Request/Response. In such a case, necessary information can be exchanged by a Data link schedule Request/Response exchange, and a Service data link Request/Response exchange becomes unnecessary. Because of this, it is possible to reduce radio wave bandwidth at a time of data link establishment. Also, it is possible to establish a data link quickly by reducing messages.

In the present embodiment, a period for the NAN device 101 to perform communication by a data link is requested by a Data link schedule Request which is a request message for the establishing a data link. However, configuration may be taken so that the NAN device 101 notifies a period in which it is desired to communicate by a data link in a message other than a Data link schedule Request. For example, configuration may be taken so that the NAN device 101 notifies beforehand prior to making the data link establishment request by a Subscribe message or a Publish message. By notifying by a Subscribe message or a Publish message, NAN devices that establish a data link can know the periods in which they mutually wish to communicate by the data link prior to requesting the data link establishment. By this, for example, the NAN device 101 becomes able to establish a data link with an NAN device that can perform data link communication in a communication period by a data link that is convenient for oneself out of the NAN devices that are providing the same service. Accordingly, the NAN device 101 can prevent only being able to communicate in a communication period which is inconvenient for oneself after starting the establishment of the data link.

Also, in the above embodiment, the application that operates on the NAN device 101 and the NAN device 103 is described as a chat application. However, the present embodiment is independent of the chat application, and can be applied in other applications. For example, a photograph sharing application, a print application, or the like apply.

Also, in the foregoing embodiment, a Subscriber executes a service discovery from transmission of a Subscribe message, but a Publisher may actively search for an NAN device that requires a service. Specifically, configuration may be taken such that an NAN data link is established in a case where a Publisher can transmit a Publish message and receive a Subscribe message as a response thereto. Also, configuration may be taken such that an NAN data link is established from both the Publisher side and the Subscriber side.

Also, in the foregoing embodiment, the NAN device 101 that requests an establishment of a data link executes processing for determining a Basic DLW (FIG. 7 and FIG. 8). However, a value for a time of a Basic DLW response may be determined on the side at which the data link establishment is requested. Specifically, it is possible to achieve a power consumption reduction for an NAN cluster as a whole by achieving a new data link establishment based on a Basic DLW for which a data link is already established on the side on which the data link establishment is requested as well.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-236993, filed Dec. 3, 2015 which is hereby incorporated by reference herein in its entirety.

The invention claimed is:

1. A communication apparatus, comprising:
one or more processors; and
one or more memories including instructions that, when executed by the one or more processors, cause the communication apparatus to:
perform first communication with another communication apparatus belonging to an NAN cluster to which the communication apparatus belongs, in a Neighbor Awareness Networking (NAN) Discovery Window (DW);
perform second communication with another communication apparatus belonging to the NAN cluster in a period other than the DW; and
determine a period for performing the second communication by negotiating with another communication apparatus, wherein
in a case where a first period has been determined by the communication apparatus as the period for performing the second communication with a first other communication apparatus, the communication apparatus determines a second period as the period for performing the second communication with a second other communication apparatus different from the first other communication apparatus so that the first period and the second period at least partially overlap.

2. The communication apparatus according to claim 1, wherein in a case where the first period has not been determined by the communication apparatus, the communication apparatus determines a predetermined period as the second period without considering the first other communication apparatus.

3. The communication apparatus according to claim 1, wherein in a case where the communication apparatus determines the second period in a state where a plurality of periods for performing the second communication are determined, the communication apparatus determines the second period so that a period, among the plurality of periods, for performing communication for executing the same service as a service executed with the second other communication apparatus and the second period at least partially overlap.

4. The communication apparatus according to claim 1, wherein the communication apparatus determines the second period so that a period for the second communication with a plurality of other communication apparatuses and the second period at least partially overlap.

5. A communication apparatus, comprising:
one or more processors; and
one or more memories including instructions that, when executed by the one or more processors, cause the communication apparatus to:
perform first communication of service information in a periodic first period in a network;
perform second communication for executing a service that indicated in the service information communicated by the first communication in a period other than the periodic first period;
determine a period, other than the first period, for performing the second communication by negotiating with another communication apparatus, wherein
in a case where a second period has been determined by the communication apparatus as a period, other than the first period, for performing the second communication with a first other communication apparatus, the communication apparatus determines a third period for performing the second communication with a second other communication apparatus different from the first other communication apparatus so that the second period and the third period at least partially overlap.

6. The communication apparatus according to claim 5, wherein in a case where the second period has not been determined, and in a case where the communication apparatus determines the third period for performing the second communication with the second other communication apparatus, the communication apparatus determines a predetermined period as the third period without considering the first other communication apparatus.

7. The communication apparatus according to claim 5, wherein a period of communication for executing the service by the second communication is started immediately after the first period.

8. The communication apparatus according to claim 5, wherein in a case where the communication apparatus determines the third period in a state where a plurality of periods for performing the second communication are determined, the communication apparatus determines the third period so that a period, among the plurality of periods, for performing communication for executing the same service as a service executed with the second other communication apparatus and the third period at least partially overlap.

9. The communication apparatus according to claim 5, wherein the communication apparatus determines the third period so that a period for communicating by the second communication with a plurality of other communication apparatuses and the third period at least partially overlap.

10. The communication apparatus according to claim 5, wherein the network is a network conforming to Neighbor Awareness Networking (NAN).

11. The communication apparatus according to claim 5, wherein the first period is a Neighbor Awareness Networking (NAN) Discovery Window (DW).

12. The communication apparatus according to claim 5, wherein the communication apparatus communicates a Neighbor Awareness Networking (NAN) Service Discovery Frame (SDF).

13. A method of controlling a communication apparatus, including:
  performing first communication with another communication apparatus belonging to an NAN cluster to which the communication apparatus belongs, in a Neighbor Awareness Networking (NAN) Discovery Window (DW);
  performing a second communication with another communication apparatus belonging to the NAN cluster in a period other than the DW; and
  determine a period for performing the second communication by negotiating with another communication apparatus, wherein
  in a case where a first period has been determined by the communication apparatus as the period for performing the second communication with a first other communication apparatus, the communication apparatus determines a second period as the period for performing the second communication with a second other communication apparatus different from the first other communication apparatus so that the first period and the second period at least partially overlap.

14. A method of controlling a communication apparatus, including:
  performing a first communication of service information in a periodic first period in a network;
  performing a second communication for executing a service indicated in the service information communicated by the first communication in a period other than the periodic first period;
  determine a period, other than the first period, for performing the second communication by negotiating with another communication apparatus, wherein
  in a case where a second period has been determined by the communication apparatus as a period, other than the first period, for performing the second communication with a first other communication apparatus, the communication apparatus determines a third period for performing the second communication with a second other communication apparatus different from the first other communication apparatus so that the second period and the third period at least partially overlap.

15. A non-transitory computer-readable storage medium storing a computer program for causing a computer to:
  perform first communication with another communication apparatus belonging to an NAN cluster to which the communication apparatus belongs, in a Neighbor Awareness Networking (NAN) Discovery Window (DW);
  perform second communication with another communication apparatus belonging to the NAN cluster in a period other than the DW; and
  determine a period for performing the second communication by negotiating with another communication apparatus, wherein
  in a case where a first period has been determined by the communication apparatus as the period for performing the second communication with a first other communication apparatus, the communication apparatus determines a second period as the period for performing the second communication with a second other communication apparatus different from the first other communication apparatus so that the first period and the second period at least partially overlap.

* * * * *